United States Patent [19]

Goto

[11] Patent Number: 5,477,303
[45] Date of Patent: Dec. 19, 1995

[54] PHOTOGRAPHIC DEVICE

[75] Inventor: Hisashi Goto, Tokyo, Japan

[73] Assignee: Olympus Optical Co., Ltd., Tokyo, Japan

[21] Appl. No.: 118,725

[22] Filed: Sep. 10, 1993

[30] Foreign Application Priority Data

Sep. 11, 1992 [JP] Japan .................. 4-243403

[51] Int. Cl.6 .................... G03B 13/36
[52] U.S. Cl. ................. 354/400; 354/406
[58] Field of Search ................ 354/406, 407, 354/408

[56] References Cited

U.S. PATENT DOCUMENTS

| | | | |
|---|---|---|---|
| 4,389,105 | 6/1983 | Kitai et al. | 354/406 |
| 4,922,281 | 5/1990 | Kitajima | 354/408 |
| 4,959,677 | 9/1990 | Suda et al. | 354/406 |
| 5,004,902 | 4/1991 | Matsui et al. | 354/407 |
| 5,321,461 | 6/1994 | Goto | 354/406 |

FOREIGN PATENT DOCUMENTS

| | | |
|---|---|---|
| 58-106511 | 6/1983 | Japan . |
| 2275916 | 11/1990 | Japan . |
| 4204429 | 7/1992 | Japan . |

*Primary Examiner*—Russell E. Adams
*Attorney, Agent, or Firm*—Cushman, Darby & Cushman

[57] ABSTRACT

The invention provides a TTL-phase difference AF type photographic device best suited for use on normal/panoramic size cameras, etc., which is built up of a condenser lens 3 located in the rear of a predetermined image-formation plane 2 of a taking lens 1, an aperture-stop 6 located in the rear of the lens 3 and having a pair of apertures, a pair of separator lenses 7 located in the rear of the aperture-stop 6, a photoreceptor element array 8 located at a position where light beams emanating from the separator lenses 7 form an image, and a pair of conversion lenses 9 which can be inserted in, or retracted from, a focal point detecting system, and have positive power. In the normal size state the conversion lenses 9 remain inserted in the focal point detecting system, and in the panoramic size state where they are retracted from the system, the absolute value of the focal point detecting system is made larger than in the normal size state, so that the focusing accuracy can be increased.

2 Claims, 7 Drawing Sheets

PHOTOGRAPHIC DEVICE

BACKGROUND OF THE INVENTION

The present invention relates to a photographic device, and more particularly to a focal point detector that can be used on a camera capable of achieving trimming photography to enhance the focusing accuracy or narrow the range of the distance to be found during trimming. Various focal point detectors have been put forward in the art so as to detect the focal points of optical instruments such as cameras, so that the results can be used for focusing. Among them, some focal point detectors making use of a light beam passing through a taking optical system or a part thereof are now widely used, primarily with single-lens reflex cameras. This is due to the advantages of the focal point detectors in that they are parallax-free irrespective of object distances; they can provide detection and correction at the time of focusing of errors in the production of taking lenses, etc. or in the driving of taking lenses for focusing; and given a light beam incident on them, they remain invariable in terms of focusing accuracy, even upon lens replacement. A typical focal point detector making use of a light beam passing through a taking optical system or a part thereof works on (1) the so-called phase correlation mode wherein light beams passing through different pupils of a taking lens are re-imaged through a pair of lenses to make use of a variation in the distance between the resulting images depending on defocusing, thereby achieving focal point detection, and on (2) the so-called contrast mode wherein the contrast of an image formed by a taking lens system is detected to find the position where it reaches a maximum, thereby achieving focal point detection.

The principle of the phase difference mode will now be explained with reference to FIG. 15 that is an optical path diagram. The arrangement shown in FIG. 15 is made up of a condenser lens 3 located in the vicinity of a predetermined image-formation plane (a predetermined focal plane or an equivalent film surface) 2, a pair of separator lenses 7 located in the rear of the condenser lens 3 and juxtaposed to each other with a gap large-enough to ensure the focusing accuracy, and a photoelectric conversion element array 8 located at a position where light beams emanating from the separator lenses 7 are to form an image.

When the taking lens 1 is in focus, an object image I is formed on the predetermined image-formation plane 2. This object image I is projected through the condenser lens 3 and compound-eye re-imaging lenses 7 on the secondary image-formation plane (the photoelectric conversion array 8) perpendicular to the optical axis of the taking lens 1, forming the first and second images $I_{o1}$ and $I_{o2}$. When an object image F is formed on the front focus or in front of the predetermined image-formation plane 2, it is projected through the lenses 3 and 7 on positions close and vertical to the optical axis of the taking lens 1, forming the first and second images $F_{o1}$ and $F_{o2}$. When an object image B is formed or the rear focus or in the rear of the predetermined image-formation plane 2, it is projected through the lenses 3 and 7 on positions farther away from and vertical to the optical axis of the taking lens 1, forming the first and second images $B_{o1}$ and $B_{o2}$. These first and second images are in the same direction, so that the distance between them can be detected to provide detection of in what state the taking lens 1 is in focus, inclusive of the front and rear focus amounts. More specifically, the light intensity distribution of the first and second images on the photoreceptor element array 8 is detected and then calculated or otherwise processed to find the distance between them. Many focal point detectors of the construction mentioned above have been disclosed in for example JP-A-55-118019, JP-A-58-106511 and JP-A-60-32012.

The principle of the contrast mode will then be explained with reference to the optical path diagrams of FIGS. 16 and 17. The arrangement shown in FIGS. 16 and 17 is built up of a condenser lens 3 located in the vicinity of a predetermined image-formation plane (a predetermined focal plane or an equivalent film surface) 2, a re-imaging lens 21 located in the rear of the condenser lens 3, and a photoelectric conversion element array 22 located at a position conjugate with respect to the predetermined image-formation plane 2. In FIG. 16 light beams passing through the taking lens 1 are shown to form an image on the predetermined image-formation plane 2, and in FIG. 17 light beams passing through the taking lens 1 are shown to form an image on a position in front of the predetermined image-formation plane 2 (or on the front focus). The image on the photoelectric conversion element array 22, as shown in FIG. 16, is well focused or of high contrast, and the image on the photoelectric conversion element array 22, as shown in FIG. 17, is poorly focused or of low contrast. If the taking lens system 1 is constantly moved in the direction of increasing contrast, it can then be moved to the focused position to achieving focusing. As disclosed in JP-A-63-127217, it is known that the contrast of an image formed through the taking optical system can be detected at two positions in the vicinity of the predetermined image-formation plane. It is also known that focal point detection can be achieved by moving the re-imaging lens.

On the other hand, many individuals have recently enjoyed full-textured pictures obtained by a certain trimming photography wherein 35-mm Leica size film with one frame size of 36 mm×12 mm (usually about 36 mm×24 mm) is exposed to light, and is then enlarged to about 7 times as large (usually to about 3.5 times as large (the so-called service size) and this is often desired by many individuals). Such photographs are called panoramic photographs. Many cameras capable of achieving panoramic-size photography are now available, and so are cameras that can easily be changed from normal size to panoramic size photography mode, and vice versa. These cameras are in greater demand than ever.

Never until now, however, is there proposed any TTL-phase difference AF (automatic focusing) system best suited for use on a camera capable of achieving trimming photography such as a normal/panoramic-size camera.

In the following description, the case where the same focus detector system is used to both normal and panoramic sizes.

Most of the chief subjects to be taken by those who use ordinary cameras are figures. For instance, consider the case of taking a souvenir photograph of some figures with a graceful range of mountains for the background, as depicted in FIG. 18. FIG. 19 represents a photographic range when some figures are mainly photographed in the normal size state, and FIG. 20 represents a photographic range when some figures are photographed in the panoramic size state with mountains for the background. The composition of FIG. 20 is exposed to light on film, as shown in FIG. 21. For panoramic photography, it is then necessary to shorten the focal length or move away from the subject, as compared with normal photography. The range of the distance to be found is shown by dotted lines in FIGS. 19, 20 and 21. The range of the distance to be found appears to be the same in size on film, but the size of the subject taken thereon varies largely. When the size of the subject coming within the range of the distance to be found is too large, it is difficult to detect the features (contrast) of the subject by the focus detector system, resulting in a lowering of the focusing accuracy. In addition, when nearby and distant objects come within the range of the distance to be found with a size reduction of the subject, as shown in FIG. 21, there is a phenomenon that distant and nearby objects coexist, which makes the focusing accuracy or probability (that is the probability that focusing is achievable) worse.

As already noted, it is generally necessary to make the focusing accuracy higher in the panoramic size state than in the normal size state, because the enlargement magnification in the former case is almost twice that in the latter. On the other hand, since panoramic-size photography is often used to take a photograph of more distant objects, as compared with normal-size photography, and so a lens having a shorter focal length is used, the demand on enlarging the range of the defocusing detected is less in panoramic-size photography than in normal-size photography.

SUMMARY OF THE INVENTION

An object of the invention, accomplished in view of such situations as mentioned above, is to provide a TTL-phase difference AF system that is best suited for use on normal/panoramic-size cameras.

According to the invention, there is provided a focal point detector device designed to be used on a camera capable of achieving trimming photography such as a normal/panoramic-size camera, characterized by increasing the absolute value of the re-projection magnification by the aforesaid condenser and re-imaging lenses in association with trimming operation such as a changeover from normal to panoramic size.

In the so-called phase difference AF, the photoelectric conversion element array comprises equidistantly arranged photoreceptor elements. The focusing accuracy, if the distance between them defines one pitch, is usually expressed relative to one pitch. Now assume that the focusing accuracy is 1/M pitch (M is a constant) and $\alpha$ is the amount of defocusing on the image plane per pitch. Then, the focusing accuracy $\Delta$ on the image plane is given by $$\Delta = \pm (1/M) \cdot \alpha \qquad (1)$$

Here, it is noted that the larger the value of $\Delta$, the lower the focusing accuracy is, and the smaller the value of $\Delta$, the higher the focusing accuracy is. The value of $\alpha$ is found by $$\alpha = (F_W/\beta) \cdot P \qquad (2)$$

where P is the pitch of the photoreceptor element array, $\beta$ is the absolute value of the projection magnification of the focus detection optical system, and $F_W$ is the F-number of the centroidal light beam detected in the focus detection optical system.

In the phase difference AF system, the features (contrast) of an image are detected from the number of some elements of the photoelectric element array, and then compared (correlated) with each other. On the basis of the results of the comparison, the amount and direction of defocusing from the focused position are calculated. The number of the elements necessary for this correlation defines the minimum range to be found. Now let N denote the number of the elements necessary for the correlation and W denote the magnitude of the direction of the element array in the minimum range to be found on the image surface. We have $$W = 1/\beta \cdot N \cdot P \qquad (3)$$

In other words, as the absolute value of the projection magnification of the focus detection optical system increases, the focusing accuracy is improved with a reduction in the range to be found; this is coincident with the condition of the focus detecting system in the panoramic size state relative to the normal size state. Equation (2) also teaches that some considerable improvement in the focusing accuracy is achieved by reducing the pitch of the photoreceptor element array. In this connection, Equation (3) reveals that the range to be found is reduced; this is coincident with the condition of the focus detecting system in the panoramic size state relative to the normal size state. Moreover, Equation (2) teaches that some considerable improvement in the focusing accuracy is achieved by reducing the value of $F_W$.

This accommodates well not only to the relation between panoramic size and normal size but also to determining the size of exposure on film whose size is different from normal size. The determination of the size of exposure may be achieved by using a light-blocking plate, by storing the size of exposure or printing on film by optical, magnetic or other means, or customization according to an order pad, etc., when printing the image on printing paper or an electronic printer.

In the so-called contrast mode, a contrast with a frequency f is estimated with an photoelectric conversion element group with an area S. This, when the magnification of the re-imaging optical system for focus detection is $\beta$, is equivalent to saying that a contrast with an area $S/\beta$ and a frequency $f \times \beta$ can be estimated on film. In other words, as the absolute value of $\beta$ increases, there is a reduction in the range to be found, making it possible to detect a contrast having a high frequency. A higher frequency results in an increase in the change of contrast with respect to the same amount of defocusing, making it possible to enhance the focusing accuracy.

As the absolute value of the projection magnification of the focus detecting system increases or the area of the photoelectric conversion elements reduces, the quantity of light falling on each photoelectric conversion element decreases. When the quantity of incident light reduces, the focusing accuracy becomes poor. However, this may be averted by (i) making the condition for actuating auxiliary means such as that for lighting up an auxiliary light source different from that in the normal size state, and (ii) making the projection magnification similar to that in the normal size state, when the luminance of the object being photographed is low.

Details of the construction and action mentioned above will be explained with reference to the embodiments of the invention which will be described later. It is noted that in the first, second and third embodiments the so-called phase difference type AF systems making use of a magnification change are envisaged, while in the fourth embodiment the so-called contrast type AF system making use of a magnification change is envisaged. In the fifth embodiment the so-called phase difference type AF system with a change in the F-number of the centroidal light beam detected is contemplated, while in the sixth embodiment the phase difference type AF system with a change in the pitch of the photoreceptor element array is contemplated. In the seventh embodiment means for storing trimming information is added to a photographic device using these AF systems.

As can be appreciated from the explanation given above, one aspect of the invention is directed to a photographic device capable of achieving trimming photography, which includes trimming means and a focal point detector comprising a taking optical system, photoelectric conversion means and a re-imaging optical system, characterized by including focusing accuracy setting means for setting the focusing accuracy at a different level when the range of the taking surface to be exposed to light is changed from the first to the second state by the trimming means, and for setting the focusing accuracy at an elevated level when the range of the taking surface to be exposed to light is narrow.

Another aspect of the invention is directed to a photographic device capable of achieving trimming photography, which includes trimming means and a focal point detector comprising a taking optical system, photoelectric conversion means and a re-imaging optical system, characterized by including means for setting the range of the distance to be found, which sets the range of the distance to be found at a different level when the range of the taking surface to be exposed to light is changed from the first to the second state by the trimming means and which sets the range of the distance to be found at a narrow level when the range of the taking surface to be exposed to light is narrow.

These aspects of the invention may be modified such that, when the range of the taking surface to be exposed to light is changed from the first to the second state, an additional optical element is added to the re-imaging optical system and the re-imaging system serves as the focusing accuracy setting means and/or the means for setting the range of the distance to be found.

Alternatively, the re-imaging optical system may be designed such that when the range of the taking surface to be exposed to light is changed from the first to the second state, the first optical element is changed over to the second optical element, and may serve as the focusing accuracy setting means and/or the means for setting the range of the distance to be found.

Still alternatively, the re-imaging optical system may be designed such that, when the range of the taking surface to be exposed to light is changed from the first to the second state, the F-number of the centroidal light beam detected is changed from the first to the second state, and may serves as the focusing accuracy setting means and/or the means for setting the range of the distance to be found. In this case, the re-imaging optical system includes a separator lens, and is designed such that, when the range of the taking surface to be exposed to light is changed from the first and the second state, the stop thereof changes over from the first to the second one.

Still further, the photographic device according to the invention may be constructed from a focus detector having means for inputting information about the range of the reproduction of the image to be photographed and focusing accuracy setting means for setting the focusing accuracy at a different level depending on the information from said inputting means or range setting means for setting the range of the distance to be found at a different level, and means for storing on an image recording medium the information about the range of the reproduction of the image photographed on the basis of the information from said inputting means.

It is noted that these photographic or camera devices may include means for storing on an image memory medium information indicating that the range of the taking surface to be exposed to light set in at least one of the first and second states.

According to the invention, trimming is done at the time of photography to set the range of the taking surface to be exposed to light at the first or second state. In addition, while the range of the taking surface to be exposed to light is kept usual during photography, the information about the range of the reproduction of the image photographed is inputted by the inputting means to transmit that information to the focusing accuracy setting means for setting the focusing accuracy at a different level or the range setting means for setting the range of the distance to be found at a different level. In this case, there is provided means for storing on the image recording medium the information about the range of the reproduction of the image photographed on the basis of the information from the inputting means.

In the invention, when the trimming photography mode for panoramic size, etc., is set, the focusing accuracy is enhanced with a narrow range of the distance to be found. It is thus possible to obtain a TTL-phase difference AF camera device best suited for use on a camera capable of achieving trimming photography such as a normal/panoramic-size camera, because the focusing accuracy is improved in the panoramic size state than in the normal size state with a narrow range of the distance to be found.

Still other objects and advantages of the invention will in part be obvious and will in part be apparent from the specification.

The invention accordingly comprises the features of construction, combinations of elements, and arrangements of parts which will be exemplified in the construction hereinafter set forth, and the scope of the invention will be indicated in the claims.

DESCRIPTION OF THE PREFERRED EMBODIMENTS

In what follows, the photographic device according to the invention will be explained with reference to some embodiments. The invention is concerned with the focal point detector for cameras capable of achieving trimming photography. In the following embodiments, however, it is noted that the invention will be explained with reference to being applied to an ordinary/panoramic-size camera.

First Embodiment

Figure 1:
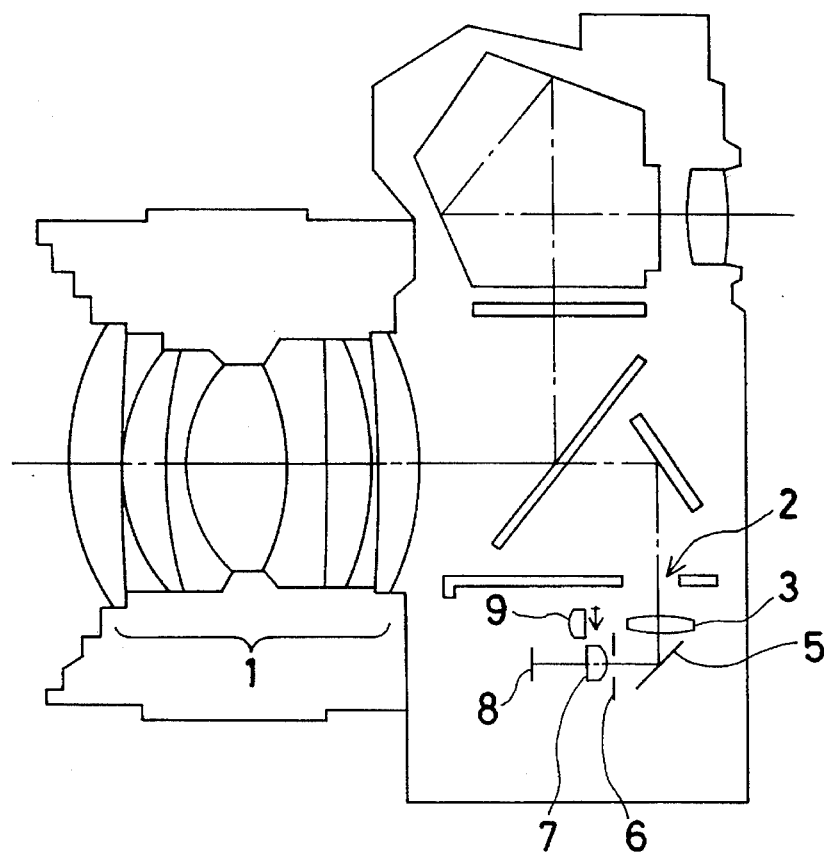
FIG. 1 is a sectional illustration of in what state the focal point detector according to the first embodiment of the invention is incorporated in the bottom of a single-lens reflex camera.
Figure 2:
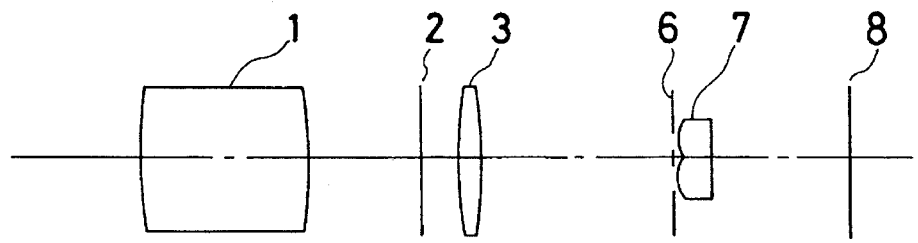
FIG. 2 is an optical path diagram showing the focal point detecting system of panoramic size according to the first embodiment.
Figure 3:
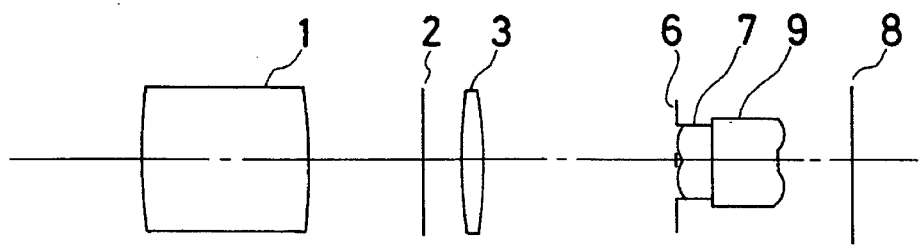
FIG. 3 is an optical path diagram showing the focal point detecting system of normal size according to the first embodiment.

FIG. 1 is a sectional schematic of how the focal point detector according to the first embodiment of the invention is incorporated in the bottom of a single-lens reflex camera. FIG. 2 is an optical path diagram showing the focal point detecting system of panoramic size according to the first embodiment of the invention, and FIG. 3 is an optical path diagram showing the focal point detecting system of normal size according to the first embodiment of the invention. This focal point detector is made up of a condenser lens 3 located in the vicinity of a predetermined image-formation surface 2 of a taking lens 1, a mirror 5 located in the rear of the condenser lens 3, an aperture-stop 6 having a pair of apertures, which are located in the rear of the mirror 5 and juxtaposed (in the direction vertical to the sheet of FIG. 1) to the mirror 5 with a gap large-enough to ensure the focusing accuracy therebetween, a pair of separator lenses 7, each located in the rear of each aperture, a photoreceptor element array 8 located in the vicinity of a position where light beams emanating from the separator lenses 7 form an image, and a pair of conversion lenses 9 having positive power, which can be inserted in, or retracted from, the focal point detecting system.

In the normal size state, a pair of conversion lenses 9 remain inserted in the focal point detecting system, as can be seen from FIG. 3. A light beam from the taking lens 1 passes through the predetermined image-formation plane 2 of the taking lens 1, and then passes through the separator and conversion lenses 7 and 9 by way of the condenser lens 3, forming a pair of secondary images $I_{N1}$ and $I_{N2}$ on the photoreceptor element array 8. In the panoramic size state, a pair of converter lenses 9 are retracted from the focal point detecting system, as can be seen from FIG. 2. A light beam from the taking lens 1 passes through the predetermined image-formation plane 2 of the taking lens 1, and then passes through the separator lenses 7 by way of the condenser lens 3, forming a pair of secondary images $I_{P1}$ and $I_{P2}$ on the photoreceptor element array 8.

In the panoramic size state where the conversion lenses 9 having positive refracting power are retracted from the focal point detecting system, the absolute value of the projection magnification of the focal point detection optical system is larger, when compared with the normal size state.

In this embodiment, the condenser lens 3 and a pair of aperture diaphragms 6 are kept in the same condition in the normal and panoramic size states; the entrance pupil and $F_W$ remain invariable.

It is desired that the positions at which light rays (centroidal light rays $I_1$ and $I_2$) passing through the center of the focal point detecting range on the predetermined image-formation surface 2 and the center of gravity of each aperture-stop 6 are incident on the photoelectric conversion element array 8 be virtually the same in both the normal and panoramic size states. To satisfy this, the distance between the apices of each of a pair of conversion lenses 9 may be determined.

It is also desired that the conjugate plane of the focal point detection optical system with respect to the predetermined image-formation surface 2 be virtually the same in both the normal and panoramic size states. To this end, the position where the conversion lenses 9 are inserted in the optical system and the thicknesses thereof may be determined. In other words, the composite principle point of the re-imaging lenses 7 and the conversion lenses 9 can be controlled depending on the position where the conversion lenses 9 are inserted in the optical system, while the length as calculated with respect to air can be controlled depending on the thicknesses of the lenses 9.

The lens data of the first embodiment of the invention will be enumerated in the following Tables 1 and 2 wherein No. represents the surface number counted from the predetermined image-formation plane 2, R the radius of curvature of each lens, D the thickness of each lens or the air separation, Nd the d-line index of refraction of each lens, $\beta_N$ the magnification of the image in the normal size state, $\beta_P$ the magnification of the image in the panoramic size state, and $F_W$ the F-number of the centroidal light beam detected. In the normal and panoramic size states, the same condenser and separator lenses 3 and 7 are used in the same layout. In Tables 1 and 2, therefore, $D_{N1}$ and $D_{P1}$, $R_{N2}$ and $R_{P2}$, $R_{N3}$ and $R_{P3}$, $D_{N2}$ and $D_{P2}$, $D_{N3}$ and $D_{P3}$, $D_{N4}$ and $D_{P4}$, $R_{N5}$ and $P_5$, $R_{N6}$ and $R_{P6}$, $D_{N5}$ and $D_{P5}$ have the same values. The lenses composed of $R_{N7}$ and $R_{N8}$, and $D_{N7}$ and $N_{N3}$ form the conversion lenses 9.

TABLE 1

| | (Normal Size State) | | |
|---|---|---|---|
| No. | R | D | Nd |
| 1 | PIFP = ∞ | $D_{N1}$ = 1.8 | |
| 2 | $R_{N2}$ = 10.85 | $D_{N2}$ = 3.0 | $N_{N1}$ = 1.4926 |
| 3 | $R_{N3}$ = −21.70 | $D_{N3}$ = 15.0 | |
| 4 | Stop = ∞ | $D_{N4}$ = 0.1 | |
| 5 | $R_{N5}$ = 2.82 | $D_{N5}$ = 1.0 | $N_{N2}$ = 1.4926 |

TABLE 1-continued (Normal Size State)

| No. | R | D | Nd |
|---|---|---|---|
| 6 | $R_{N6} = \infty$ | $D_{N6} = 0.0$ | |
| 7 | $R_{N7} = \infty$ | $D_{N7} = 6.0$ | $N_{N3} = 1.4926$ |
| 8 | $R_{N8} = -1.69$ | | |

(PIFP = Predetermined Image-Formation Plane)
$\beta_N = -0.25$
$F_W = 10$
Decentration of the optical axes of the separator lenses with respect to that of the condenser lens: 0.83
Decentration of the optical axes of the conversion lenses with respect to that of the condenser lens: 1.18
Separation between the reference two images: 2.35

TABLE 2

(Panoramic Size State)

| No. | R | D | Nd |
|---|---|---|---|
| 1 | PIFP $= \infty$ | $D_{P1} = 1.8$ | |
| 2 | $R_{P2} = 10.85$ | $D_{P2} = 3.0$ | $N_{P1} = 1.4926$ |
| 3 | $R_{P3} = -21.70$ | $D_{P3} = 15.0$ | |
| 4 | Stop $= \infty$ | $D_{P4} = 0.1$ | |
| 5 | $R_{P5} = 2.82$ | $D_{P5} = 1.0$ | $N_{P2} = 1.4926$ |
| 7 | $R_{P6} = \infty$ | | |

$\beta_P = -0.50$
$F_W = 10$
Decentration of the optical axes of the separator lenses with respect to that of condenser lens: 0.83
Separation between the reference two images: 2.35

Second Embodiment

Figure 4:
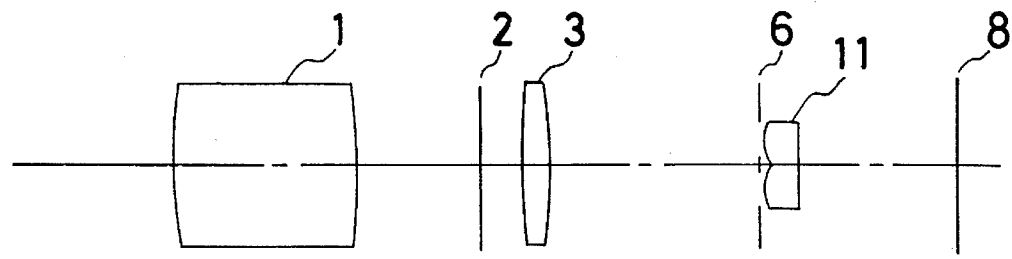
FIG. 4 is an optical path diagram showing the focal point detecting system of panoramic size according to the second embodiment.
Figure 5:
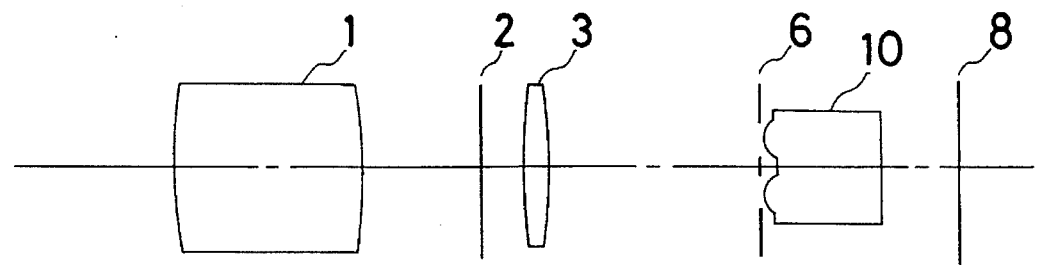
FIG. 5 is an optical path diagram showing the focal point detecting system of normal size according to the second embodiment.

FIG. 4 is an optical path diagram showing the focal point detecting system of panoramic size according to the second embodiment of the invention, and FIG. 5 is an optical path diagram showing the focal point detecting system of normal size according to the second embodiment of the invention. This focal point detector is made up of a condenser lens 3 located in the vicinity of a predetermined image-formation plane 2 of a taking lens 1, a mirror 5 (FIG. 1) located in the rear of the condenser lens 3, an aperture-stop 6 having a pair of apertures, which are located in the rear of the mirror 5 and juxtaposed with each other with a gap large-enough to ensure the focusing accuracy therebetween, a pair of separator lenses 10 or 11, each located in the rear of the aperture-stop 6, and a photoreceptor element array 8 located in the vicinity of a position where light beams leaving the separator lenses 10 or 11 form an image. The separator lenses 10 and 11 are interchangeable between the panoramic and normal size states. The absolute value of the projection magnification of the focal point detecting system is larger in the panoramic size state than in the normal size state. In the normal size state, a light beam from the taking lens 1 passes through the predetermined image-formation plane 2 of the taking lens 1, and then passes through the separator lenses 10 for the panoramic size state by way of the condenser lens 3, forming a pair of secondary images $I_{N1}$ and $I_{N2}$ on the photoreceptor element array 8.

In the panoramic size state, a light beam from the taking lens 1 passes through the predetermined image-formation plane 2 of the taking lens 1, and then passes through the separator lenses 11 for the panoramic size state by way of the condenser lens 3, forming a pair of secondary images $I_{P1}$ and $I_{P2}$ on the photoreceptor element array 8. The focal lengths of the separator lenses 11 in the panoramic size state are longer than those of the separator lenses 10 in the normal size state, so that the absolute value of the projection magnification of the focal point detecting system is larger in the panoramic size state than in the normal size state.

In this embodiment, the condenser lens 3 and a pair of aperture-stops 6 are kept in the same condition in both the normal and panoramic size states; the entrance pupil and $F_W$ of the focal point detecting system remain invariable.

It is desired that the positions at which light rays (centroidal light rays $I_1$ and $I_2$) passing through the center of the focal point detecting range on the predetermined image-formation plane 2 and the center of gravity of the aperture-stop 6 are incident on the photoelectric conversion element array 8 be virtually the same in both the normal and panoramic size states. To satisfy this, the distance between the apices of each of a pair of conversion lenses 9 may be determined.

It is also desired that the conjugate plane of the focal point detection optical system with respect to the predetermined image-formation plane 2 be virtually the same in both normal and panoramic size states. To satisfy this, the thicknesses of the separator lenses 10 or 11 may be determined. More specifically, the separator lenses 11 in the panoramic size state may be made smaller than those of the separator lenses 10 in the normal size state. In other words, the length, as calculated with respect to air, can be controlled by the thicknesses of the lenses.

The lens data of the second embodiment of the invention will be enumerated in the following Tables 3 and 4 wherein No. represents the surface number counted from the predetermined image-formation surface 2, R the radius of curvature of each lens, D the lens thickness or the air separation, Nd the d-line index of refraction of each lens, $\beta_N$ the magnification of the image in the normal size state, $\beta_P$ the magnification of the image in the panoramic size state, and $F_W$ the F-number of the centroidal light beam detected. In the normal and panoramic size states, the same condenser 3 and a pair of apertures 6 are used in the same layout. In Tables 3 and 4, therefore, $D_{N1}$ and $D_{P1}$, $R_{N2}$ and $R_{P2}$, $R_{N3}$ and $R_{P3}$, $D_{N2}$ and $D_{P2}$, $D_{N3}$ and $D_{P3}$ have the same values.

TABLE 3

(Normal Size State)

| No. | R | D | Nd |
|---|---|---|---|
| 1 | PIFP $= \infty$ | $D_{N1} = 1.8$ | |
| 2 | $R_{N2} = 10.85$ | $D_{N2} = 3.0$ | $N_{N1} = 1.4926$ |
| 3 | $R_{N3} = -21.70$ | $D_{N3} = 15.0$ | |
| 4 | Stop $= \infty$ | $D_{N4} = 0.1$ | |
| 5 | $R_{N5} = 2.26$ | $D_{N5} = 6.4$ | $N_{N2} = 1.4926$ |
| 6 | $R_{N6} = \infty$ | | |

(PIFP = Predetermined Image-Formation Plane)
$\beta_N = -0.37$
$F_W = 10$
Decentration of the optical axes of the separator lenses with respect to that of the condenser lens: 0.9
Separation between the reference two images: 2.35

TABLE 4

(Panoramic Size State)

| No. | R | D | Nd |
|---|---|---|---|
| 1 | PIFP $= \infty$ | $D_{P1} = 1.8$ | |
| 2 | $R_{P2} = 10.85$ | $D_{P2} = 3.0$ | $N_{P1} = 1.4926$ |
| 3 | $R_{P3} = -21.70$ | $D_{P3} = 15.0$ | |

TABLE 4-continued (Panoramic Size State)

| No. | R | D | Nd |
|---|---|---|---|
| 4 | Stop = ∞ | $D_{P4} = 0.1$ | |
| 6 | $R_{P5} = 2.82$ | $D_{P5} = 1.0$ | $N_{P2} = 1.4926$ |
| 7 | $R_{P6} = \infty$ | | |

$\beta_P = -0.50$
$F_W = 10$
Decentration of the optical axes of the separator lenses with respect to that of the condenser lens: 0.83
Separation between the reference two images: 2.35

In this embodiment, the exit surfaces of the separator lenses 10 and 11 are described as being flat; however, it is noted that they may have a certain curvature.

Third Embodiment

Figure 6:
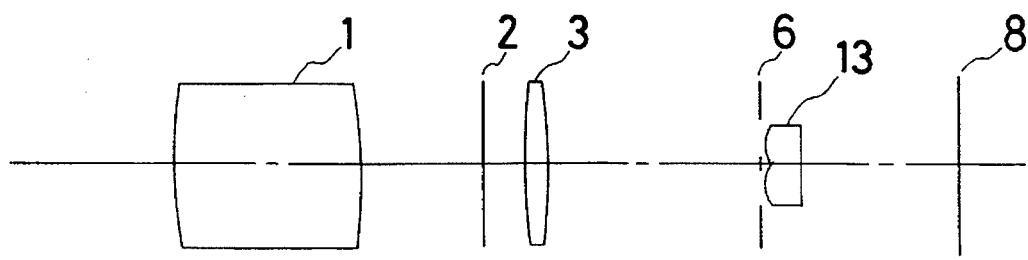
FIG. 6 is an optical path diagram showing the focal point detecting system of panoramic size according to the third embodiment.
Figure 7:
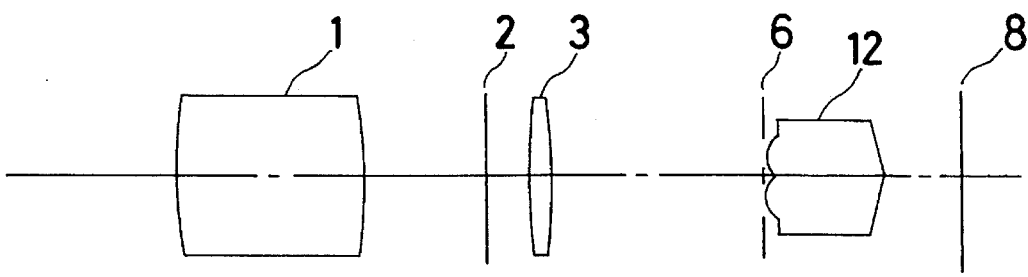
FIG. 7 is an optical path diagram showing the focal point detecting system of normal size according to the third embodiment.

FIG. 6 is an optical path diagram showing the focal point detecting system of panoramic size according to the third embodiment of the invention, and FIG. 7 is an optical path diagram showing the focal point detecting system of normal size according to the third embodiment of the invention. This focal point detecting arrangement is made up of a condenser lens 3 located in the vicinity of a predetermined image-formation plane 2 of a taking lens 1, a mirror 5 (FIG. 1) located in the rear of the condenser lens 3, an aperture-stop 6 having a pair of apertures, which are located in the rear of the mirror 5 and juxtaposed to each other with a gap large-enough to ensure focusing the accuracy therebetween, a pair of separator lenses 12 or 13, each located in the rear of each aperture diaphragm 6, and a photoreceptor element array 8 located in the vicinity of a position where light beams leaving the separator lenses 12 or 13 form an image. The separator lenses 12 and 13 are interchangeable between the panoramic and normal size states. The absolute value of the projection magnification of the focal point detecting system is larger in the panoramic size state than in the normal size state. In the normal size state, a light beam from the taking lens 1 passes through the predetermined image-formation plane 2 of the taking lens 1, and then passes through the separator lenses 12 for the panoramic size state by way of the condenser lens 3, forming a pair of secondary images $I_{N1}$ and $I_{N2}$ on the photoreceptor element array 8.

In the panoramic size state, a light beam from the taking lens 1 passes through the predetermined image-formation surface 2 of the taking lens 1, and then passes through the separator lenses 13 for the panoramic size state by way of the condenser lens 3, forming a pair of secondary images $I_{P1}$ and $I_{P2}$ on the photoreceptor element array 8. The focal lengths of the separator lenses 13 in the panoramic size state are longer than those of the separator lenses 12 in the normal size state, so that the absolute value of the projection magnification of the focal point detecting system is larger in the panoramic size state than in the normal size state.

In this embodiment, the condenser lens 3 and aperture-stop 6 are the same in both the normal and panoramic size states; the entrance pupil and $F_W$ of the focal point detecting system remain invariable.

It is desired that the positions at which light rays (centroidal light rays $I_1$ and $I_2$) passing through the center of the focal point detecting range on the predetermined image-formation plane 2 and the center of gravity of the aperture-stop 6 are incident on the photoelectric conversion element array 8 be virtually the same in both the normal and panoramic size states. To satisfy this, the respective exit surfaces of the separator lenses 12 may be inclined from the plane vertical to the optical axis of the condenser lens.

It is also desired that the conjugate plane of the focal point detecting optical system with respect to the predetermined image-formation plane 2 be virtually the same in both normal and panoramic size states. To this end, the thicknesses of the separator lenses 12 and 13 may be determined. More specifically, the separator lenses 13 in the panoramic size state may be made smaller in thickness than the separator lenses 12 in the normal size state. In other words, the length, as calculated with respect to air, can be controlled by the thicknesses of the lenses.

The lens data of the third embodiment of the invention will be enumerated in the following Tables 5 and 6 wherein No. represents the surface number counted from the predetermined image-formation surface 2, R the radius of curvature of each lens, D the lens thickness or the air separation, Nd the d-line index of refraction of each lens, $\beta_N$ the magnification of the image in the normal size state, $\beta_P$ the magnification of the image in the panoramic size state, and $F_W$ the F-number of the centroidal light beam detected. In the normal and panoramic size states, the same condenser 3 and a pair of apertures 6 are used in the same layout. In Tables 5 and 6, therefore, $D_{N1}$ and $D_{P1}$, $R_{N2}$ and $R_{P2}$, $R_{N3}$ and $R_{P3}$, $D_{N2}$ and $D_{P2}$, $D_{N3}$ and $D_{P3}$ have the same values.

TABLE 5

(Normal Size State)

| No. | R | D | Nd |
|---|---|---|---|
| 1 | PIFP = ∞ | $D_{N1} = 1.8$ | |
| 2 | $R_{N2} = 10.85$ | $D_{N2} = 3.0$ | $N_{N1} = 1.4926$ |
| 3 | $R_{N3} = -21.70$ | $D_{N3} = 15.0$ | |
| 4 | Stop = ∞ | $D_{N4} = 0.1$ | |
| 5 | $R_{N5} = 2.82$ | $D_{N5} = 6.4$ | $N_{N2} = 1.4926$ |
| 6 | $R_{N6} = \infty$ | | |

(PIFP = Predetermined Image-Formation Plane)
$\beta_N = -0.37$
$F_W = 10$
Decentration of the optical axes of the separator lenses with respect to that of the condenser lens: 0.83
Angles of the exit surfaces of the separator lenses with respect to the optical axis of the condenser lens: 82.8°
Separation between the reference two images: 2.35

TABLE 6

(Panoramic Size State)

| No. | R | D | Nd |
|---|---|---|---|
| 1 | PIFP = ∞ | $D_{P1} = 1.8$ | |
| 2 | $R_{P2} = 10.85$ | $D_{P2} = 3.0$ | $N_{P1} = 1.4926$ |
| 3 | $R_{P3} = -21.70$ | $D_{P3} = 15.0$ | |
| 4 | Stop = ∞ | $D_{P4} = 0.1$ | |
| 6 | $R_{P5} = 2.82$ | $D_{P5} = 1.0$ | $N_{P2} = 1.4926$ |
| 7 | $R_{P6} = \infty$ | | |

$\beta_P = -0.50$
$F_W = 10$
Decentration of the optical axes of the separator lenses with respect to that of the condenser lens: 0.83
Angles of the exit surfaces of the separator lenses with respect to the optical axis of the condenser lens: 90°
Separation between the reference two images: 2.35

In this embodiment, the exit surfaces of the separator lenses 12 and 13 are described as being flat; however, it is noted that they may have a certain curvature with the optical axes inclined with respect to the optical axis of the condenser lens 3.

In the first, second and third embodiments described above, it is understood that the condenser lens and aperture-stop may be varied, or the condenser lens, aperture-stop and separator lenses may be moved either along or off the optical axis to change the magnification of the focal point detection optical system. If there is no problem in view of camera design, there may then be a variation in $F_W$ or the image-plane relation between the predetermined image-formation surface and the photoelectric conversion element array.

Fourth Embodiment

Figure 8:
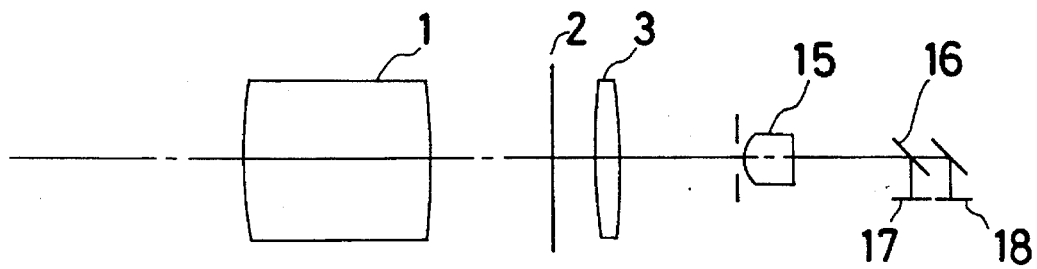
FIG. 8 is an optical path diagram showing the focal point detecting system of panoramic size according to the fourth embodiment.
Figure 9:
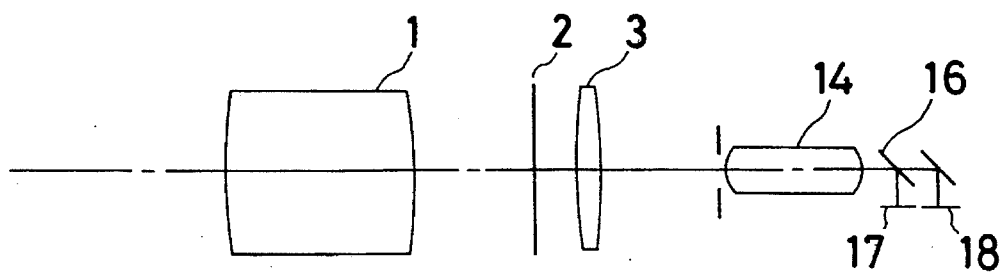
FIG. 9 is an optical path diagram showing the focal point detecting system of normal size according to the fourth embodiment.

FIG. 8 is an optical path diagram showing the focal point detecting system of panoramic size according to the fourth embodiment of the invention, and FIG. 9 is an optical path diagram showing the focal point detecting system of normal size according to the fourth embodiment of the invention. This focal point detector is made up of a condenser lens 3 located in the vicinity of a predetermined image-formation plane 2 of a taking lens 1, a mirror 5 (FIG. 1) located in the rear of the condenser lens 3, a re-imaging lens 14 or 15 located in the rear of the mirror 5, an half mirror 16 located in the rear of the re-imaging lens 14 or 15, a photoelectric conversion element group 17 positioned more closely to the predetermined image-formation plane 2 than to a position where the light beam reflected by the half mirror 16 forms an image, and a photoelectric conversion element group 18 located farther away from the predetermined image-formation plane 2 than from the position where the light beam passing through the half mirror 16 forms an image. The re-imaging lenses 14 and 15 are interchangeable between the panoramic and normal size states. The absolute value of the projection magnification of the focal point detection optical system is larger in the panoramic size state than in the normal size state. In the normal size state, a light beam from the taking lens 1 passes through the predetermined image-formation plane 2 of the taking lens 1, and then passes through the re-imaging lens 14 for the panoramic size state by way of the condenser lens 3, forming a pair of secondary images $I_{NF}$ and $I_{NR}$ on the photoelectric conversion element groups 17 and 18.

In the panoramic size state, a light beam from the taking lens 1 passes through the predetermined image-formation plane 2 of the taking lens 1, and then passes through the re-imaging lens 15 for the panoramic size state by way of the condenser lens 3, forming a pair of secondary images $I_{PF}$ and $I_{PR}$ on the photoelectric conversion element groups 17 and 18. The focal length of the re-imaging lens 15 in the panoramic size state is longer than that of the re-imaging lens 14 in the normal size state, so that the absolute value of the projection magnification of the focal point detection optical system is larger in the panoramic size state than in the normal size state.

It is also desired that the conjugate plane of the focal point detection optical system with respect to the predetermined image-formation plane 2 be virtually the same in both the normal and panoramic size states. To satisfy this, the thicknesses of the re-imaging lenses 14 and 15 may be determined. More specifically, the re-imaging lens 15 in the panoramic size state may be made smaller in thickness than the re-imaging lens 14 in the normal size state. In other words, the length, as calculated with respect to air, can be controlled by the thicknesses of the lenses.

The lens data of the fourth embodiment of the invention will be enumerated in the following Tables 7 and 8 wherein No. represents the surface number counted from the predetermined image-formation plane 2, R the radius of curvature of each lens, D the lens thickness or the air separation, Nd the d-line index of refraction of each lens, $\beta_N$ the magnification of the image in the normal size state, $\beta_P$ the magnification of the image in the panoramic size state, and $F_W$ the F-number of the centroidal light beam detected. In the normal and panoramic size states, the same condenser 3 is used in the same layout. In Tables 7 and 8, therefore, $D_{N1}$ and $D_{P1}$, $R_{N2}$ and $R_{P2}$, $R_{N3}$ and $R_{P3}$, and $D_{N2}$ and $D_{P2}$, have the same values.

TABLE 7

(Normal Size State)

| No. | R | D | Nd |
|---|---|---|---|
| 1 | PIFP = ∞ | $D_{N1}$ = 1.8 | |
| 2 | $R_{N2}$ = 10.85 | $D_{N2}$ = 3.0 | $N_{N1}$ = 1.4926 |
| 3 | $R_{N3}$ = −21.70 | $D_{N3}$ = 15.0 | |
| 4 | Stop = ∞ | $D_{N4}$ = 0.1 | |
| 5 | $R_{N5}$ = 2.82 | $D_{N5}$ = 7.0 | $N_{N2}$ = 1.4926 |
| 6 | $R_{N6}$ = −1.69 | | |

(PIFP = Predetermined Image-Formation Plane)
$\beta_N$ = −0.25

TABLE 8

(Panoramic Size State)

| No. | R | D | Nd |
|---|---|---|---|
| 1 | PIFP = ∞ | $D_{N1}$ = 1.8 | |
| 2 | $R_{P2}$ = 10.85 | $D_{P2}$ = 3.0 | $N_{P1}$ = 1.4926 |
| 3 | $R_{P3}$ = −21.70 | $D_{P3}$ = 15.0 | |
| 4 | Stop = ∞ | $D_{P4}$ = 0.1 | |
| 6 | $R_{P5}$ = 2.82 | $D_{P5}$ = 1.0 | $N_{P2}$ = 1.4926 |
| 7 | $R_{P6}$ = ∞ | | |

$\beta_P$ = −0.50

While the photoelectric conversion element groups 17 and are used in this embodiment, it is understood that they may be built up of one- or two-dimensional sensors.

While the two photoelectric conversion element arrays 17 and 18 are used in this embodiment, it is understood that one photoelectric conversion element array may be located in the vicinity of the conjugate point of the predetermined image-formation plane 2, thereby creating a system to find the focusing point while driving the focusing lens of the taking lens 1.

Further, while the re-imaging lenses 14 and 15 is changed over from one to another, it is understood that the condenser or re-imaging lenses may be designed to be move, thereby creating a so-called zoom lens system to vary the magnification of the focal point detection optical system.

Fifth Embodiment

Figure 10:
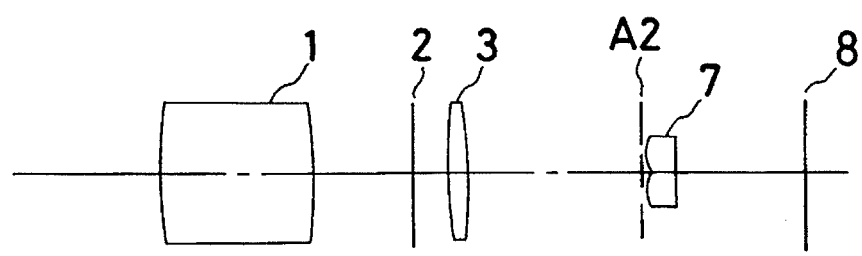
FIG. 10 is an optical path diagram showing the focal point detecting system of panoramic size according to the fifth embodiment.
Figure 11:
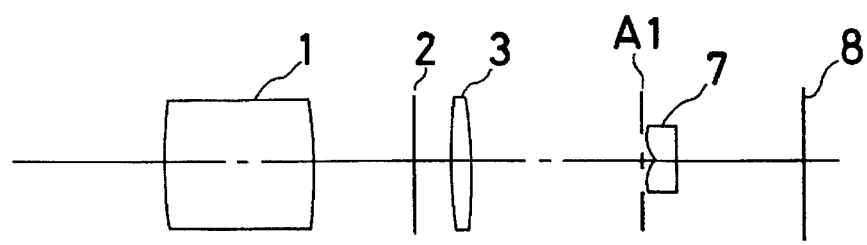
FIG. 11 is an optical path diagram showing the focal point detecting system of normal size according to the fifth embodiment.
Figure 12:
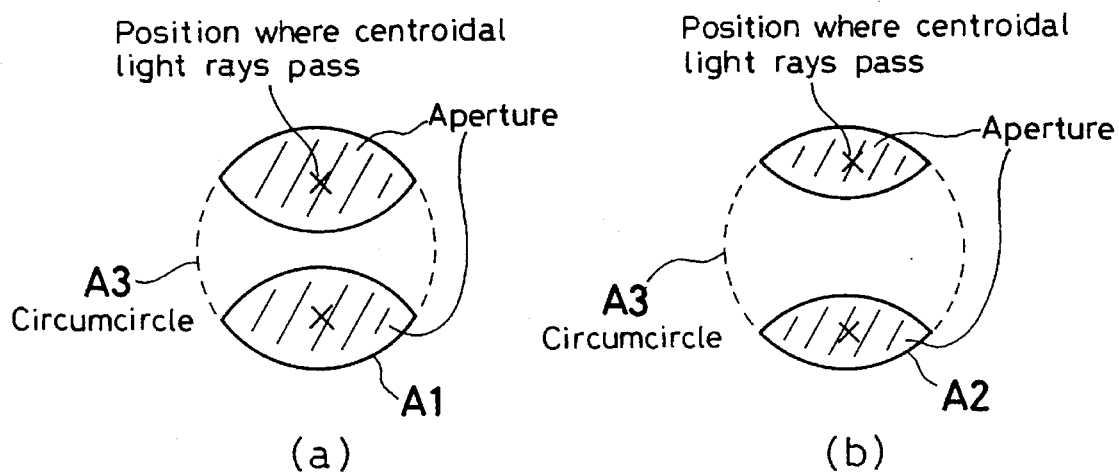
FIG. 12 is a view showing the configuration of the apertures of the aperture-stop used in the fifth embodiment.

FIG. 10 is an optical path diagram showing the focal point detecting system of panoramic size according to the fifth embodiment of the invention, and FIG. 11 is an optical path diagram showing the focal point detecting system of normal size according to the fifth embodiment of the invention. This focal point detector is made up of a condenser lens 3 located in the vicinity of a predetermined image-formation plane 2 of a taking lens 1, a mirror 5 (FIG. 1) located in the rear of the condenser lens 3, an aperture-stop A1 (FIG. 10) having a pair of apertures for normal-size photography, which are located in the rear of the mirror 5 and juxtaposed to each other with a gap large-enough to ensure the focusing accuracy therebetween, an aperture-stop A2 having a pair of apertures for panoramic-size photography, which is interchangeable to the aperture-stop A1, a pair of separator lenses 7, each located in the rear of each aperture-stop A1 or A2, and a photoreceptor element array 8 located in the vicinity of a position where light beams emanating from the separator lenses 7 form an image. FIG. 12(a) illustrates the aperture configuration of the aperture-stop A1 having a pair of apertures for normal-size photography, and FIG. 12(b) depicts the aperture configuration of the aperture-stop A2 having a pair of apertures for panoramic-size photography. Since the apertures of A1 are smaller than those of A2, as shown, the focusing accuracy is increased by changing the aperture-stop from A1 to A2 in panoramic-size photography. In this embodiment, the circumcircles A3 of the aperture configurations shown in FIGS. 12(a) and (b) are of the same size. Here, it is noted that the circumcircles A3 are determined in view of the exit pupil size of the taking lens 1.

Sixth Embodiment

Referring here to the above-mentioned equations (2) and (3), the smaller the pitch P of the photoreceptor element array, the better the focusing accuracy and the narrower the range to be found, and this conforms to the condition of the focal point detecting system in the panoramic size state with respect to the normal size state.

Figure 13:
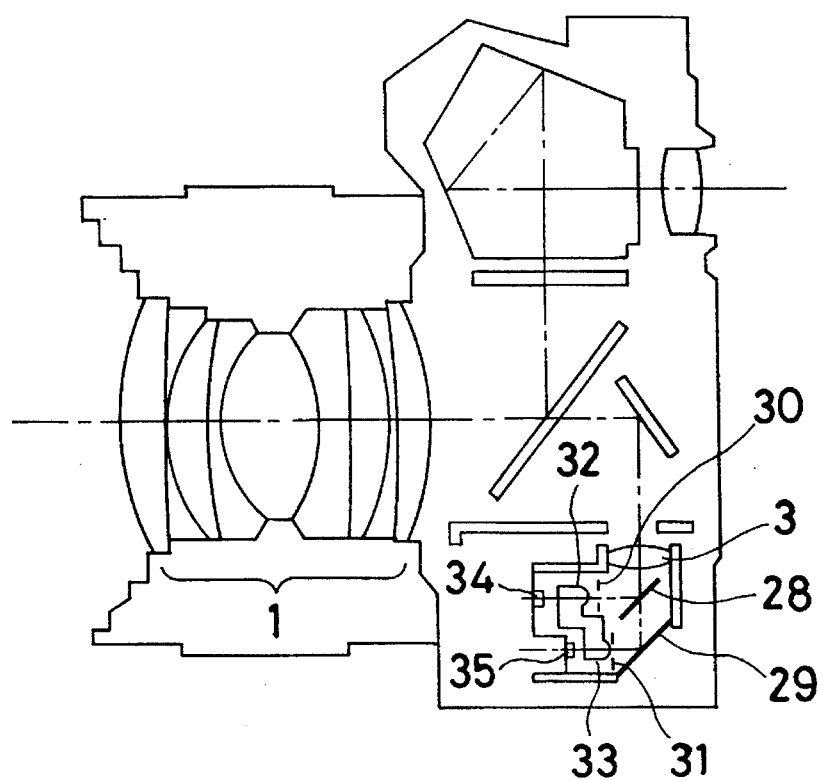
FIG. 13 is a sectional view of the sixth embodiment, similar to FIG. 1.
Figure 14:
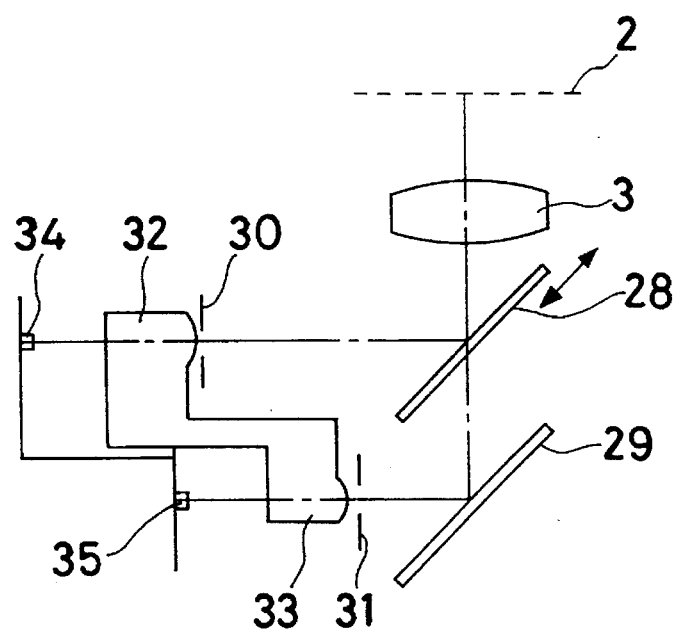
FIG. 14 is an optical path diagram showing the optical system according to the sixth embodiment.
Figure 15:
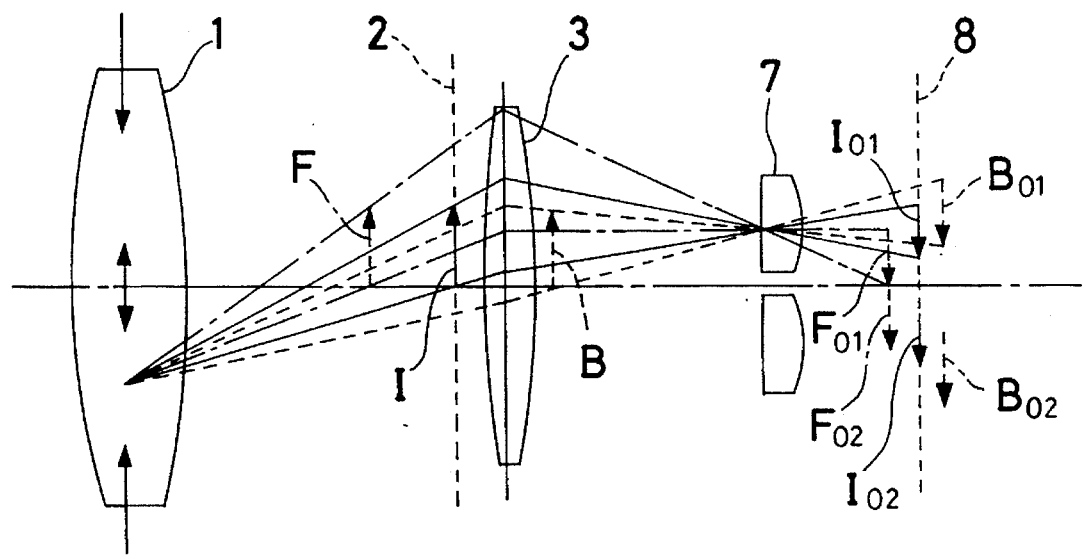
FIG. 15 is an optical path diagram showing the principle of the phase difference mode.
Figure 16:
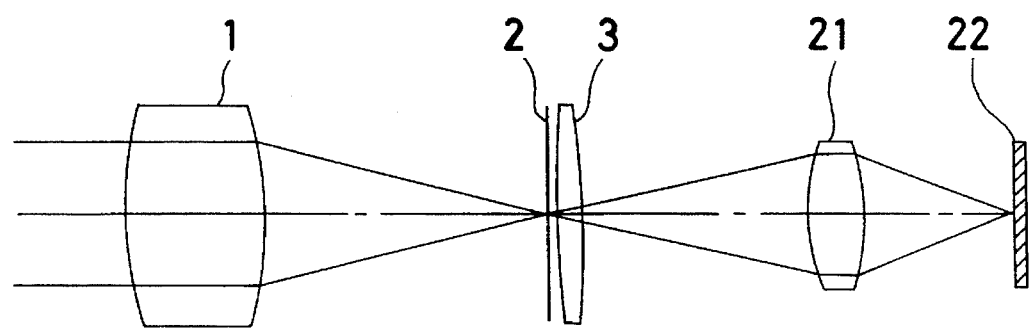
FIG. 16 is an optical path diagram showing the principle of the contrast mode, in which an image is shown to be formed on the predetermined image-formation plane.
Figure 17:
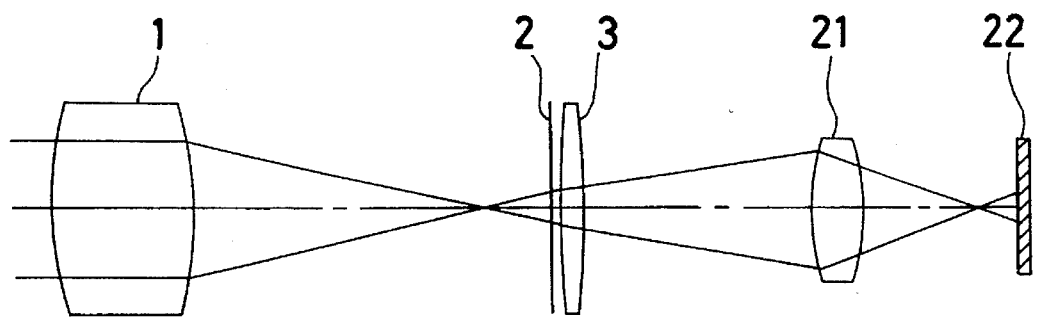
FIG. 17 is an optical path diagram showing the front focus state in the contrast mode.
Figure 18:
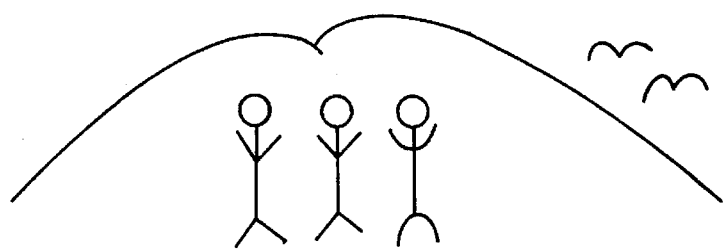
FIG. 18 illustrates the case of taking a souvenir photograph of some figures with a chain of mountains for the background.
Figure 19:
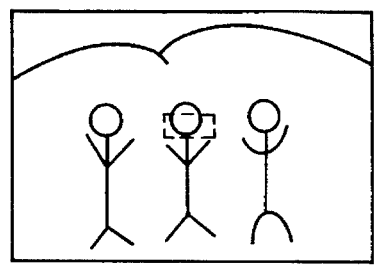
FIG. 19 illustrates the taking range when taking a photograph of some figures on the normal size mode.
Figure 20:
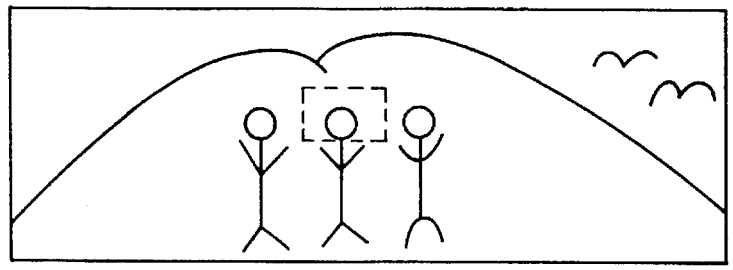
FIG. 20 illustrates the taking range when taking a photograph of some figures on the panoramic size mode.
Figure 21:
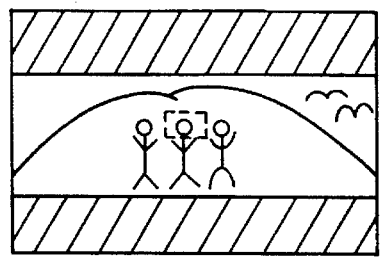
FIG. 21 illustrates the range of film to be exposed to light in panoramic size photography.

In what follows, reference will be made to the six embodiment of the invention wherein the pitch P of the photoreceptor element array is reduced for panoramic photography. FIG. 13 a sectional view of how the focal point detector of the sixth embodiment is incorporated in the bottom of a single-lens reflex camera, and FIG. 14 is an optical path diagram showing an optical system including juxtaposed photoelectric conversion elements built up of photoelectric element arrays having varying pitches. This focal point detector is built up of a focal point detecting system I comprising a condenser lens 3 located in the vicinity of a predetermined image-formation plane 2 of a taking lens 1, a mirror 28 located in the rear of the condenser lens 3 and designed to be retractable from the optical path, an aperture-stop 30 having a pair of apertures which are juxtaposed to each other with a gap large-enough to ensure the focusing accuracy and in the direction normal to the sheet of FIG. 14, a pair of re-imaging lenses 32 located in the rear of the apertures of the aperture-stop 30 and juxtaposed to each other in the direction perpendicular to the sheet of FIG. 14 and a photoreceptor element 34 located at a position where light beams emanating from the re-imaging lenses 32 form an image, and a focal point detecting system II comprising an aperture-stop 31 which is located on the optical path from which the mirror 28 is retracted and in the rear of a mirror 29 and has a pair of apertures juxtaposed to each other with a gap large-enough to ensure the focusing accuracy and in the direction perpendicular to the sheet of FIG. 14, a pair of re-imaging lenses 33 located in the rear of a pair of apertures of the aperture-stop 31 and juxtaposed to each other in the direction vertical to the sheet of FIG. 14, and a photoreceptor element 35 located at a position where light beams emanating from the re-imaging lenses 33 form an image. The re-imaging lenses 32 and 33 have the same magnification, and the pitch of the element array of the photoreceptor element 34 is smaller than that of the photoreceptor element 35.

According to this embodiment, the mirror 28 is inserted on the optical path for panoramic photography. In the focal point detecting system I, some part of the light beam emanating from the taking lens 1 and passing through the predetermined image-formation plane 2 of the taking lens 1 and then through the condenser lens 3 is reflected by the mirror 28. This light beam passes through the re-imaging lenses 32, forming secondary images $I_{P1}$ and $I_{P2}$ on the photoreceptor element 34. For normal photography, the mirror 28 is retracted from the optical path. In the focal point detecting system II, when the mirror 28 is retracted from the optical path, some part of the light beam emanating from the taking lens 1 and passing through the predetermined image-formation plane 2 of the taking lens 1 and then through the condenser lens 3 is reflected by the mirror 29. This light beam passes through the re-imaging lenses 33, forming secondary images $I_{N1}$ and $I_{N2}$ on the photoreceptor element 35.

It is thus possible to increase the focusing accuracy and make the range to be found narrow by reducing the pitch of the photoreceptor element array in association with the changing from normal to panoramic size.

While the phase correlation mode is used in this embodiment, it is understood that this embodiment can work on the contrast mode. Also, an optical system with a bendable optical axis may be used in place of the mirror retractable from the optical path, and may be located in the rear of the re-imaging lenses. Further, the photoreceptor elements per se may be moved for changeover.

It is understood that this embodiment, if including three or more photoreceptor elements, may accommodate to panoramic changeover or other trimming photography. Also, an optical path splitter member such as a half mirror may be used in place of the retractable mirror to read information from the photoreceptor 35 in normal photography and from the photoreceptor element 34 in panoramic photography. Here it goes without saying that if this embodiment is used in combination with re-imaging lenses having a varying magnification, it is possible to enhance the effect of the invention further.

Seventh Embodiment

This embodiment is directed to a photographic device built up of a focal point detector comprising a trimming information input means, and a focusing accuracy setting means capable of increasing the focal point detection accuracy on the basis of trimming information or a range-of-the-distance-to-be-found setting means capable of making the range of the distance to be found narrow, and an image memory medium capable of storing the trimming information by magnetic, optical or mechanical means such as silver salt film, a magnetic tape, a floppy disk, or the like. When a photographer intends to do trimming photography, the trimming-photographic purpose is transmitted to the photographic device through the means for inputting the trimming information. Then, the photographic device sets the focal point detection accuracy or the range of the distance to be found for photography. The focal point detector used here may be any one of those explained in the first to sixth embodiments. The information about the image taken is stored in the image memory medium in which the trimming information is also stored. Only the portion of the image information to be trimmed or the overall image information may be stored in the image memory medium. When the portion to be trimmed is stored on the image recording medium, the trimming should be done at the time of photography, whereas when all the image is stored on the image recording medium, the trimming should be done at the time of reproduction. In the latter case, the imagewise information must all be stored and the trimming should be done at the time of trimming on the basis of the information about the range to the reproduction of the photographed image. When the image memory medium is silver salt film, the image information is stored by exposure to light. For instance, this may be achieved by storing the trimming information between this image information and the next image information, storing the trimming information on one or both sides of the film of the outside of the range of the image information to be exposed to light according to an exposure pattern or as by boring the film, magnetically storing the trimming information on film on which magnetic material is wholly or partly coated, or the like. According to the thus stored trimming information, the image information is then reproduced on printing paper or a display screen by image reproducer means such as a projector. In this case, the transmission of the trimming information to the image reproducer means may be achieved either on line or off line.

While the photographic device of the invention has been described with reference to some embodiments, it is understood that the invention is not limited to these embodiments, and so may be variously modified.

As can be understood from the above explanation, the photographic device of the invention can be used to construct a TTL-phase different AF photographic device best suited for use on a camera capable of achieving trimming photography such as a normal/panoramic-size camera. This is because when trimming photography of panoramic size, etc. is preset, the focusing accuracy is so increased and the range of the distance to be found is so narrow that the focusing accuracy can be more enhanced in panoramic photography than in normal photography with a reduction in the range of the distance to be found.

What I claim is:

1. A focal point detecting system comprising:

a taking optical system, a photoelectric conversion means consisting of photoelectric conversion element arrays for receiving light beams passing through said taking optical system; and a re-imaging optical system for guiding said light beams to said photoelectric conversion means and for detecting said focal point;

whereby said re-imaging optical system includes magnification conversion means for converting an imaging magnification value from a first value to a second value;

wherein said magnification conversion means includes a conversion lens adapted to be inserted in or removed from an optical path of said focal point detecting system.

2. A focal point detecting system comprising:

a taking optical system;

a photoelectric conversion means consisting of photoelectric conversion element arrays for receiving light beams passing through said taking optical system; and a re-imaging optical system for guiding said light beams to said photoelectric conversion means and for detecting said focal point, whereby said re-imaging optical system includes magnification conversion means for converting an imaging magnification value from a first value to a second value;

wherein said magnification conversion means includes a pair of imaging lenses having different focal distances and adapted to be selectively placed in an optical path of said focal point detecting system.

\* \* \* \* \*